US008763081B2

(12) United States Patent
Bogdanovic et al.

(10) Patent No.: US 8,763,081 B2
(45) Date of Patent: Jun. 24, 2014

(54) NETWORK BASED AUTHENTICATION

(75) Inventors: Ivan Dean Bogdanovic, Brookline, MA (US); Justin A. Aborn, Hingham, MA (US); Steven H. Blumenthal, Lexington, MA (US); Sanjay Jhawar, Chicago, IL (US)

(73) Assignee: Bridgeport Networks, Inc., Chicago, IL (US)

( * ) Notice: Subject to any disclaimer, the term of this patent is extended or adjusted under 35 U.S.C. 154(b) by 1760 days.

(21) Appl. No.: 11/397,313

(22) Filed: Apr. 3, 2006

(65) Prior Publication Data

US 2007/0234404 A1    Oct. 4, 2007

(51) Int. Cl.
*H04L 29/06* (2006.01)
*H04L 9/32* (2006.01)

(52) U.S. Cl.
CPC .............. *G06K 21/34* (2013.01); *H04L 9/3271* (2013.01); *H04L 63/0853* (2013.01)
USPC ............... 726/3; 455/410; 455/411; 455/425; 455/558

(58) Field of Classification Search
CPC .... G06F 21/34; H04L 9/3271; H04L 63/0853
USPC .................... 726/2–3; 713/161; 455/410, 411
See application file for complete search history.

(56) References Cited

U.S. PATENT DOCUMENTS

| | | | |
|---|---|---|---|
| 6,208,724 B1 * | 3/2001 | Fritzinger et al. | 379/201.01 |
| 6,216,014 B1 * | 4/2001 | Proust et al. | 455/558 |
| 6,359,699 B1 * | 3/2002 | Yoneta et al. | 358/1.16 |
| 6,481,621 B1 * | 11/2002 | Herrendoerfer et al. | 235/380 |
| 7,387,258 B2 * | 6/2008 | Potonniee et al. | 235/492 |
| 7,454,233 B2 * | 11/2008 | Lu et al. | 455/558 |
| 2001/0007129 A1 * | 7/2001 | Bendel et al. | 713/172 |
| 2002/0087408 A1 * | 7/2002 | Burnett | 705/14 |
| 2002/0100798 A1 * | 8/2002 | Farrugia et al. | 235/380 |
| 2002/0144139 A1 * | 10/2002 | Ladwig | 713/200 |
| 2002/0159601 A1 * | 10/2002 | Bushmitch et al. | 380/277 |
| 2002/0188736 A1 * | 12/2002 | Jarvensivu | 709/229 |

(Continued)

FOREIGN PATENT DOCUMENTS

| | | |
|---|---|---|
| EP | 1519603 | 3/2005 |
| GB | 2406925 | 4/2005 |
| WO | WO03/030445 | 4/2003 |

OTHER PUBLICATIONS

Kato et al., A Secure Flash Card Solution for Remote Access for Mobile Workforce, Aug. 2003, IEEE Transactions on Consumer Electronics, vol. 49, No. 3, pp. 561-566.*

(Continued)

*Primary Examiner* — Morshed Mehedi
*Assistant Examiner* — Kenneth Chang
(74) *Attorney, Agent, or Firm* — Occhiuti & Rohlicek LLP

(57) ABSTRACT

Application layer authentication of a data-network based application makes use of a SIM function accessible to the application and telephone network authentication service accessible to a server to the application. For example, the application uses SIP (Session Initiation Protocol) for communication with the server and the authentication service is provided via a GSM based telephone network. In one implementation, a device (a "dongle") includes an authentication module, application software, and an interface for communicating with a remote server over a data communication network. The application software includes instructions for using the authentication module to authorize an application layer interaction with the remote server.

14 Claims, 5 Drawing Sheets

(56) References Cited

U.S. PATENT DOCUMENTS

| | | | |
|---|---|---|---|
| 2003/0066893 A1* | 4/2003 | Yap et al. | 235/487 |
| 2003/0139180 A1* | 7/2003 | McIntosh et al. | 455/426 |
| 2003/0178482 A1* | 9/2003 | Kisliakov | 235/380 |
| 2003/0190908 A1* | 10/2003 | Craven | 455/411 |
| 2005/0066069 A1* | 3/2005 | Kaji | 710/1 |
| 2005/0066179 A1 | 3/2005 | Seidlein | |
| 2005/0227717 A1* | 10/2005 | Cantini et al. | 455/509 |
| 2007/0058814 A1* | 3/2007 | Robinson | 380/280 |
| 2007/0060124 A1* | 3/2007 | Kalavade | 455/433 |

OTHER PUBLICATIONS

Official Communication mailed September Aug. 27, 2007 for European Application No. 07007133.7-2412.
"Digital Cellular Telecommunications System (Phase 2+); Universal Mobile Telecommunications Systems (UMTS); 3G Security; Access Security for IP-based services (3GPP TS 33.203 version 7.0.0 Release 7); ETSI TS 133 203", ETSI Standards, European Telecommunications Standards Institute, Sophia-Antipo, FR, vol. 3-SA3, No. V700, Dec. 2005, pp. 1 to 49, XP014032871.

\* cited by examiner

NETWORK BASED AUTHENTICATION

CROSS-REFERENCE TO RELATED APPLICATIONS

This application is related to PCT Application PCT/US2005/025353 designating the United States, titled "PRESENCE DETECTION AND HANDOFF FOR CELLULAR AND INTERNET PROTOCOL TELEPHONY", and published on Feb. 23, 2006, as WO 2006/020168A2, the contents of which are incorporated here by reference.

BACKGROUND

This document relates to network based authentication.

GSM cellular telephone systems, for example, use a subscriber identification module (SIM) in a user's mobile phone (MS, Mobile Station) for authentication prior to establishing a telephone call with the MS. In one approach, an HLR (Home Location Register) in conjunction with an AuC (Authentication Center) shared secret authentication data (e.g., a secret key Ki) with the SIM for each user that is registered in the HLR.

The SIM is designed not to disclose the secret authentication data, and the AuC/HLR also protects that data. When authentication for a call is needed, the MSC (Mobile Switching Center) of the network that is handling the MS requests data from the AuC/HLR, this data is commonly referred to as a "triplet," consisting of RAND, SRES, and Kc. The RAND is a random number, which in combination with Ki the secret authentication data known to the SIM in the MS can generate SRES (signed response) and Kc (confidentiality key). The MSC passes RAND to the MS, which uses the SIM card's cryptographic processing of RAND to generate SRES and Kc. The MS sends SRES back to the MSC. The MSC compares the value of SRES it received from the AuC/HLR and the value it received from the MS, and if it they match, it treats the MS as authenticated. The MSC and MS then communicate securely based on the session key Kc they now know they share. In GSM networks, Kc is sent from MSC to Base Transceiver Station to be able to encrypt/decrypt the over-the-air channel.

The SIM is typically implemented as a removable card that can be moved from phone to phone when a user changes phones. The SIM card can include storage for data that is personal to the user, including for example, a dialing directory, call logs, and text or voice messages.

SIM functions have been integrated into computer-based devices, for example, for use for secure commercial transactions. For example, a commerce server may authenticate a credit card in an exchange that is similar to that used in a GSM network.

SIM functions have also been used for access control for wireless networks, in which an authentication server for the wireless network, for example, a server that interacts with the wireless devices using the RADIUS protocol, communicates with the HLR/AuC function of a wireless telephone network to receive a (RAND, SRES, Kc) triplet that the authentication server uses to determine whether to provide network access to the wireless device. In some such approaches, EAP (Extensible Authentication Protocol)—SIM and 802.1x protocols are used between the wireless device and the authentication server. The SIM function in such approaches can be integrated into a USB or PCMCIA card for insertion into a computer that seeks to be authenticated to access a wireless network.

SUMMARY

In one aspect, in general, application layer authentication of a data-network based application that is remote to a server makes use of a SIM function accessible to the application and telephone network authentication service accessible to the server. In some examples, the application uses SIP (Session Initiation Protocol) for communication with the server and the authentication service is provided via a GSM based telephone network.

In another aspect, in general, an apparatus includes an authentication module, application software, and an interface for communicating with a remote server over a data communication network. The application software includes instructions for using the authentication module to authorize an application layer interaction with the remote server.

One or more of the following features may be included.

The apparatus is removably attachable to a computer system. For example, the interface includes a Universal Serial Bus (USB) interface.

The application software is for execution on the computer system.

The application software includes instructions for a communication application. For example, the communication application comprises a softphone application. The communication application can include a configurable user interface for emulating one of a plurality of mobile telephone devices.

The authentication module includes a module compatible with authentication in a mobile telephone network. For example, the authentication module includes at least one of a Subscriber Identification Module (SIM), a Universal Subscriber Identity Module (USIM), a 3GPP IP Multimedia Subsystem Services Identity Module (ISIM), and a module compatible with a CDMA or 3GPP2 networks.

The application layer interaction includes a voice communication interaction.

The application layer interaction includes a registration interaction. For example, the registration interaction includes a Session Initiation Protocol (SIP) interaction.

The instructions for using the authentication module to authorize the application layer interaction include instructions that cause authentication via a telephone network authentication system.

The apparatus further includes a positioning system. For example, the positioning system includes a Global Positioning System (GPS).

The application software includes instructions for accessing the positioning system and providing location information over the data communication network.

In another aspect, executable software is loaded from a removable device. The software is executed. This execution includes accessing an authentication module on the removable device, communicating with a remote server over a data communication network, and using the authentication module to authorize an application layer interaction with the remote server.

One or more of the following features may be included:

Executing of the software is performed on a mobile computer system to which the removable device is attached.

The removable device is attached to the computer system.

Executing of the software includes executing a communication application. For example, the communication application includes a softphone application.

In another aspect, in general, an application layer request is received from a client over a data communication network. An authentication exchange is performed for the client with an authentication service over a telecommunication network.

This exchange includes receiving authentication data for the client. The authentication data is used to perform an authentication exchange with the client over the data communication network.

One or more of the following features may be included.

Receiving the application layer request includes receiving a session initiation request. For example, receiving the session initiation request includes receiving a Session Initiation Protocol (SIP) registration request.

Performing the authentication exchange over the telecommunication network includes emulating an authentication exchange for a mobile station accessing the telecommunication network.

After performing the authentication exchange with the client, communication services are provided for the client via the data communication network and the telecommunication network.

In another aspect, in general, a content request is received at a content distributor from a client device over a data communication network. An authentication exchange is performed for the client device between the content distributor and an authentication service. This exchange includes receiving authentication data for the client device at the content distributor. The authentication data is used to securely distribute content to the client device.

One or more of the following features may be included.

Securely distributing the content to the client device includes performing encryption based on secret information shared between the authentication service and the client device. For example, the secret information shared between the authentication service and the client device includes information stored on an authentication module at the client device. The authentication module may include at least one of a Subscriber Identification Module (SIM), a Universal Subscriber Identity Module (USIM), a 3GPP IP Multimedia Subsystem Services Identity Module (ISIM), and a module compatible with a CDMA or 3GPP2 networks.

The authentication service is associated with at least one of a manufacturer of the client device, a mobile network operator, a credit card company, a computer or software company, and a media seller.

In another aspect, in general, a rights management system includes one or more authentication centers, and a set of content distributors in communication with the authentication centers, with least some of the content distributors being in communication with a common one of the authentication centers. Multiple client devices are each configured to securely receive content from one or more of the content distributors and each include an authentication module for use in authenticating the client device to the content distributors. Each content distributor is configured to authenticate a client device using one of the authentication centers and an authentication exchange with the client device, and to cryptographically secure content for sending to the client device such that the secured content is accessible using the authentication module at that client. The authentication module at the client device includes, for example, at least one of a Subscriber Identification Module (SIM), a Universal Subscriber Identity Module (USIM), a 3GPP IP Multimedia Subsystem Services Identity Module (ISIM), and a module compatible with a CDMA or 3GPP2 networks.

Implementations can have one or more of the following advantages.

Authentication of application-layer communication using a SIM allows network connectivity to be controlled separately, and possibly using different mechanisms, from control of access to application functions.

Using a SIM for repeated generation of new keys to protect a media stream can provide better security compared with using a single key for an entire session. For example, a secure VoIP call can make use of frequent changes in SIM generated key used to protect SIP signaling and/or an RTP data stream.

No modification of a local area network infrastructure is necessarily needed to support application layer authentication. For example, a wireless device can join a wireless LAN, for example, in a public place and separately establish authenticated communication through a wireless communication network without requiring any device, such as a proxy authentication service, to be present on the local network.

A user can have a personal dongle that holds both a communication application and a SIM function, thereby allowing the user to establish secure communication from a computer that does not have preexisting support for such communication. For example, a user may have access to a networked computer, and by inserting such a USB dongle, execute an application stored on the dongle and authenticate the application using the SIM function on the dongle, even though the computer does not have any particular support for the application or authentication approach.

An open rights management system can be established in which authentication centers are separate from content distributors. For example, each content presentation device (e.g., a music player) can be associated with a corresponding authentication center. When a content distributor needs to authenticate a presentation device, it uses an appropriate authentication center for the device. In this way, a user of a content presentation device is not tied to any one particular content distributor, as long as the content distributor they use is able to use the appropriate authentication center.

Other features and advantages will become apparent from the following description and from the claims.

DESCRIPTION

Figure 1:
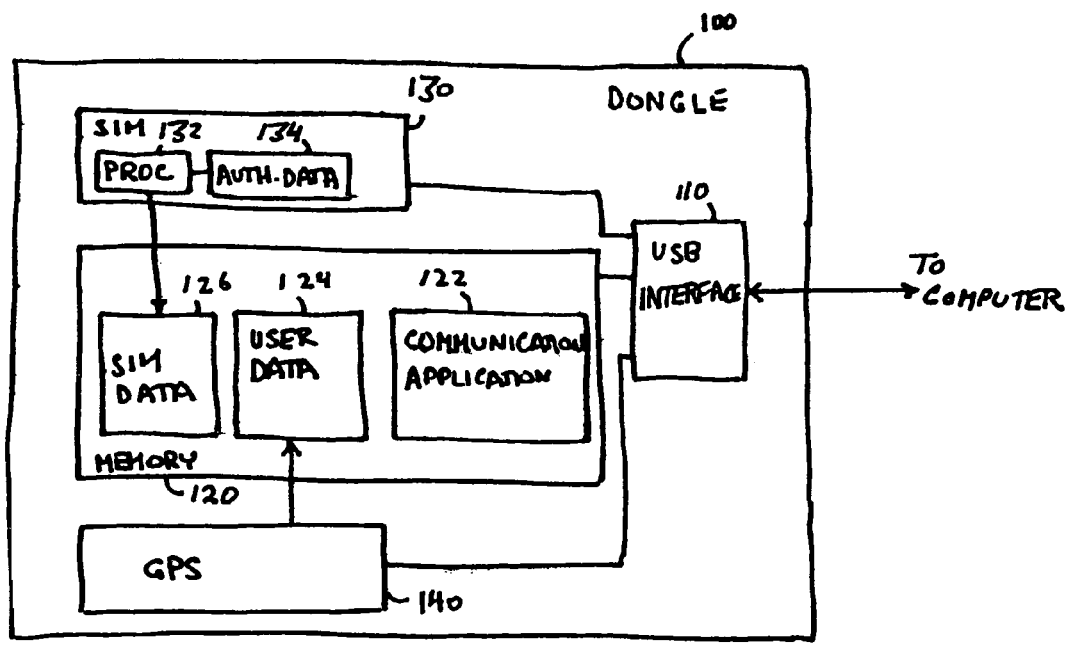
FIG. 1 is a dongle for use with a computer, for example, via a USB (Universal Serial Bus) interface.

Referring to FIG. 1, a "dongle" 100 is configured to be used with a client computer 200 (see FIG. 2), such as a laptop personal computer. (A "dongle" typically includes a security or authentication device that is configured to be plugged into a port of, or otherwise connected to, another device, such as a computer, to enable particular functions on that device). In this example, the dongle 100 uses a USB (universal serial bus) 110 interface for communication with the computer. The USB interface 110 provides electrical and signal protocol support that allows the computer to communicate with and access functions on the dongle. For example, the USB interface 110 presents a storage device (e.g., disk drive) interface to the computer allowing the computer to access a non-volatile memory 120 (e.g., a flash memory) on the dongle 100, for example, formatted according to a disk format (e.g., with files, directories, etc.). The USB interface 110 also presents a SIM device interface to a SIM 130 that is integrated into the dongle (or alternatively, removably inserted as a separate SIM card that is used in the dongle). The SIM device interface provides functionality, including, for example, a mechanism for providing a RAND from the computer, and for passing back to the computer a derived SRES and Kc that is computed in a processor 132 in the SIM and that depends on the RAND and secret authentication data 134 in the SIM 130.

The memory 120 on the dongle 100 includes an application 122, which can be executed on the computer to which the dongle is attached. For example, the application can include one or more files that include executable instructions (e.g., .exe and .dll files for execution under a version of the Microsoft Windows operating system) as well as configuration files that are used by the executing application. The application can alternatively or additionally include versions suitable for other operating systems (e.g., Apple Mac OS X) or other operating environments (e.g., a JAVA Virtual Machine).

The memory 120 can also store user data 124, which is specific to the user. For example, such data can include the user's address book and/or information related to the communication application. The memory 120 can also store SIM data 126, which is accessed by the SIM, or alternatively, such SIM data may be held within the SIM, for example, in the case that the SIM is a removable card.

In some examples, the dongle 100 also includes a GPS receiver 140, which can determine a geographic location of the dongle. In some examples, the location information is stored in the user data 124 and later accessed through the USB interface 110, which can be accessed via the USB interface 110. In some examples, the location information in the GPS received 140 is accessed directly through the USB interface 110.

Figure 2:
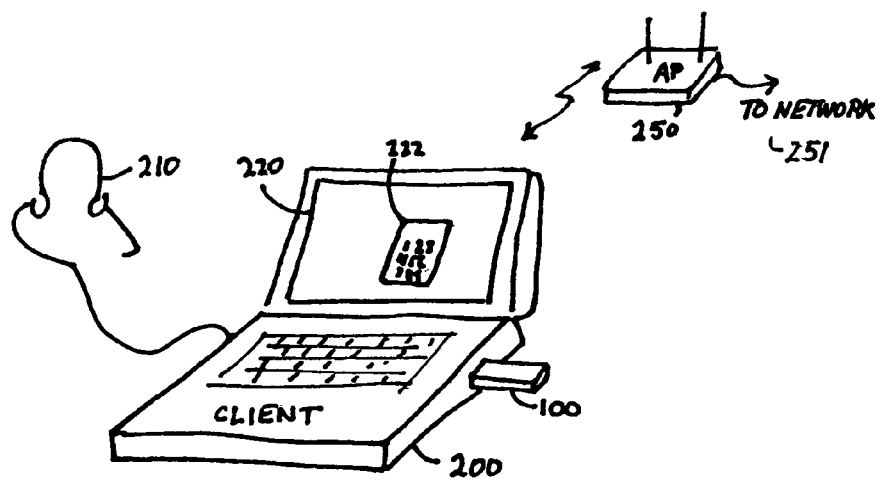
FIG. 2 is a client computer coupled to a wireless access point, which provides network connectivity to the client computer.

Referring to FIG. 2, the client computer 200 has established wireless communication via a wireless access point 250 to a network 251. For example, the access point 250 couples the computer to a local area network, which provides the computer with an Internet Protocol host address (for example, using a DHCP (Dynamic Host Configuration Protocol) server on the LAN) and which provides a gateway to a wide area IP network, such as a gateway to the public Internet. The local network does not necessarily have to be configured specifically to take advantages of functionality provided by the dongle. For example, the local network may be at an Internet "hotspot" or "cafe" that provides free or pay public access to the Internet.

In some examples S1, the communication application 122 (see FIG. 1) that is stored on the dongle 100 is a voice-over-IP communication application (e.g., a "softphone"). In such an example, a user inserts the dongle 100 into the client computer 200. The user has access to the memory 120 of the dongle and executes the communication application, for example, by manually navigating the file system represented in the memory. Alternatively, the communication application "auto-executes" as a result of the operating system detecting insertion of the dongle into the USB interface of the computer 200.

The executing communication application presents a user interface 222 (for example, showing a telephone dialing keypad) on a display 220 of the computer. The computer also has an audio input/output device 210 that is coupled to the executing application, for example, to provide a speech input/output interface for the user of the application. In some examples, a softphone application is configurable so that the user interface matches a physical mobile telephone model (e.g., another phone owned by the user of the application).

Figure 3:
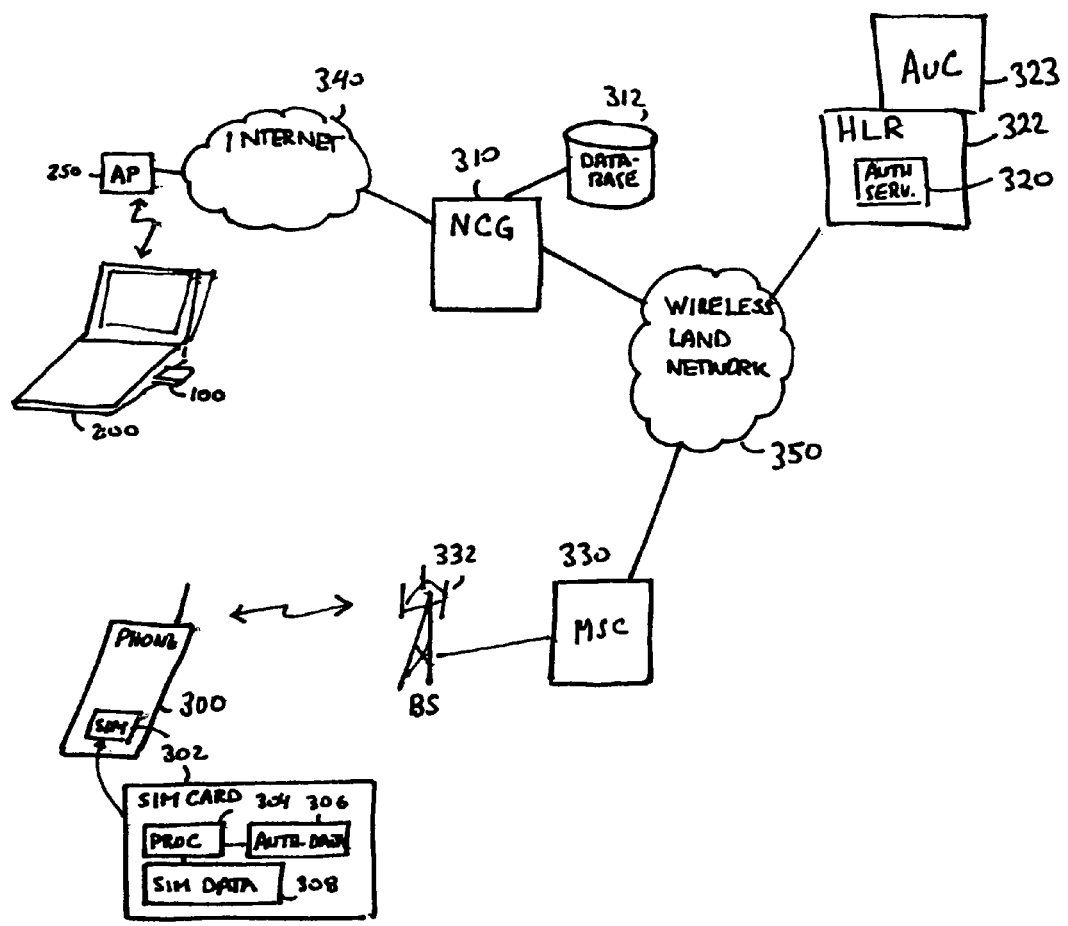
FIG. 3 is a computer and communication network system.

Referring to FIG. 3, to initiate or receive calls, the communication application executing on the client computer 200 registers with a gateway (NCG) 310, which is coupled to both the Internet 340 for communication with the computer 200 via the wireless access point 250, and is also coupled to a wireless land network 350 for communication with functions in the wireless network. In this example, the gateway 310 communicates with the network elements using standard GSM/MAP/SS7 protocols. An authentication service 320, in this example provided by a HLR (Home Location Register) 322 in conjunction with an AuC (Authentication Center) 323, is coupled to the network 350.

In an approach described in the PCT Application "PRESENCE DETECTION AND HANDOFF FOR CELLULAR AND INTERNET PROTOCOL TELEPHONY," which is incorporated by reference, the gateway 310, which is also referred to as a "Network Convergence Gateway (NCG)", enables a VoIP application running on the computer 200 to make and receive calls using the SIP protocol between the application and the gateway 310, while the gateway uses wireless network techniques to make and maintain the calls in the wireless network.

Before continuing with the description of functions involving the NCG 310, conventional authentication of a mobile station (MS) 300 (e.g., a phone) is described. When the MS 300 needs to be authenticated by the MSC (Mobile Switching Center) 330 that is providing connectivity between the MS and the wireless network via a BS (Base Station), the MSC receives identifying information for the MS, typically the IMSI (International Mobile Subscriber Identifier) for the phone. The MSC sends the IMSI to the authentication service 320, which returns the (RAND, SRES, Kc) triplet to the MSC 330. The MSC sends the RAND to the phone 330, which passes the RAND to the SIM card 302 in the phone. The SIM card 302 returns the SRES and Kc to the phone, which forwards only the SRES back to the MSC. The MSC authenticates the phone if the SRES from the authentication service and from the phone match.

Figure 4:
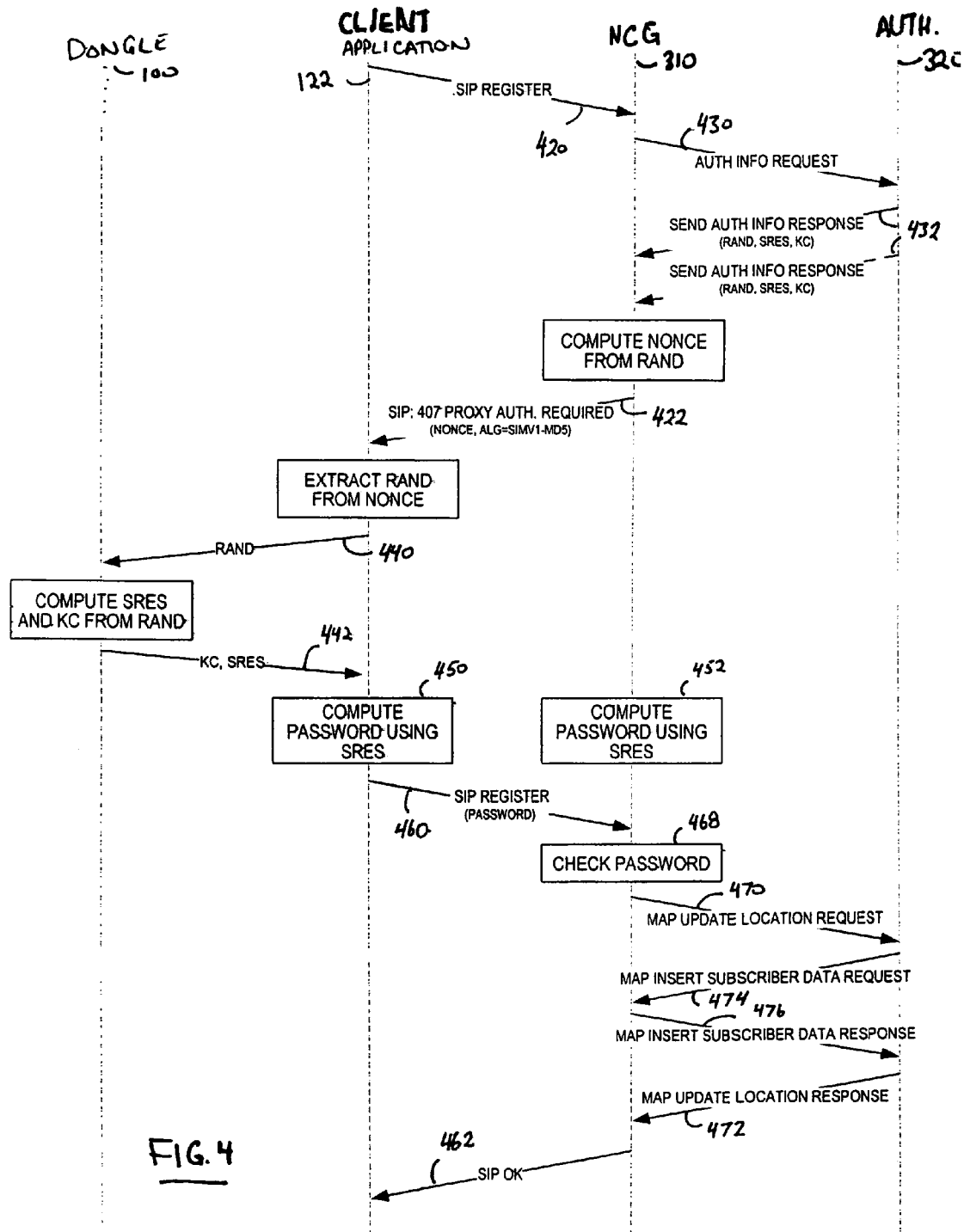
FIG. 4 is diagram that illustrates interactions between elements of the system.

Referring to FIG. 4, in the case of a communication application 122 executing on the client computer 200, a related sequence of exchanges is performed (reference numerals in parentheses below indicate messages or steps illustrated in FIG. 4). Note that in FIG. 4, the client computer already has network connectivity over the Internet and can access the NCG 310 using standard IP- and UDP/TCP-based communication. As an initial step of execution of the communication application, the application sends a request to the dongle 100 to read the identity of the NCG server 310 with which it should register, and the dongle 100 returns a SIP identity where the application should register, for example, as IMSI@nomadic.com. The communication application 122 then sends a SIP registration message to the NCG 310 (420) that includes the SIP identity. The NCG determines that SIM-based authentication is required, for example, because it is required for all SIP registrations, or based on configuration data that identifies that such authentication is required for this client. Using the same protocols as used between the MSC 330 (see FIG. 3) and the authentication service 320, the NCG 310 sends the IMSI for the SIM to the authentication service 320 (430) and in return, the authentication service returns a (RAND, SRES, Kc) triplet (432). Multiple triples may be returned in multiple messages 432, for example, if longer or additional keys Kc are needed. The NCG replies (422) to the registration request with a "407 unauthorized, authentication required" SIP message to the communication application.

The reply 422 from the NCG 310 to the communication application 122 includes the RAND, an identifier of the hash algorithm (e.g., SIMv1-MD5) to apply to the data in the next registration request, and a Nonce that depends on RAND and server-specific information. The communication application 122 receives the reply (422), extracts the RAND from the Nonce, and passes the RAND to the dongle 100 (440). In return, the dongle returns the SRES and Kc (442) to the communication application 122. The communication application (122) uses the SRES to computes the password for the new registration request (450). The NCG similarly computes the hash (452) using the same value of SRES. The communication application 122 sends a SIP registration request (460), including the computed password to the NCG. The NCG compares the passwords (468), and if they match, authenticates the communication application. The NCG 310 sends a location update request (470) via SS7 to the HLR, which causes phone calls to the user to be delivered through the NCG. The HLR may request subscriber data (474) which the NCG provides in return (476). The HLR confirms the location update (472). At that point, the NCG responds (462) to the SIP registration request with an OK message.

At this point, the NCG 310 and the communication application 122 share knowledge of a session key Kc, which was computed from the RAND provided by the AuC/HLR. This key is optionally used to encrypt communication between the communication application and the NCG. For example, when a VoIP call is established with a RTP (Real-Time Protocol) media session between the communication application and a media server at the NCG, the session key Kc is optionally used to protect the data. The same Kc can be used for the life of the registration of the communication application with the NCG. The NCG can periodically challenge the communication application with a new RAND received (as part of a triplet) from the authentication service 320, and with the response to each challenge, the communication application and the NCG update the key. Therefore, the same key does not have to be used for an extended period. Even within an active VoIP call, the value of Kc protecting the RTP data stream and be changed, for example, once every minute, providing increased cryptographic protection as compared, to using the same value of Kc for the duration of a call.

The SIP/SIM based authentication described above is at the application layer (i.e. ISO layer 5 or above) rather than at a data link or network/transport layer and is in addition to and/or separate from authentication used to establish network connectivity for the client computer on the wireless LAN via the access point 250.

In some examples of this approach, the SIM is not integrated in a dongle 100. For example, the SIM function may be built into a computer as part of its motherboard or in a socket that receives a standard SIM card. Similarly, a VoIP phone, which connects directly to an Ethernet may have the SIM built in or a SIM card plugged into a socket. In each of these examples, the communication between the device and the NCG follows the approach described above with reference to FIG. 4. Similarly, a dual-mode telephone than can operate on the cellular radio network as well as on a wireless LAN can host a SIP-based communication application that communicates with the NCG as described above.

In examples in which the dongle 100 includes a GPS receiver 140, location data can be provided to the NCG 310, for example, as part of the SIP registration, and in turn provided to the HLR or other network elements. This location information can be used, for example, for emergency calls (e911 calls) to determine the location of the calling telephone. In examples where GPS reception is not available at the location where the application is executing, the GPS receiver 140 may store the last known location in the user data 124 of the dongle, and the last known location can be provided to the network elements.

Referring back to FIG. 3, the NCG can provide additional services related to a user's personal data. In FIG. 3, the user may have a phone 300 as well as a personal computer 200, both of which may have personal data such as a contact (dialing directory) database, call logs, and voice and text messages. On the phone, this data would typically be stored in SIM data 308 on the SIM card. On the computer, this data may be stored on the dongle 100, or may be stored in memory on the computer itself. The NCG, or another server, provides a way for synchronizing this user data using a centralized storage (database is not needed and storage is more general term) 312. For example, the phone 300 may communicate with the NCG using IP-based communication (e.g., using a GPRS protocol) to synchronize its data with the database. Similarly, the client computer 200 communicates using IP with the database. SIM-based authentication of the type described above may be used to protect the data. As an alternative, the phone 300 communicates using SMS, USSD or other circuit-switched or mobile packet switched techniques to synchronize its data with the database.

The approach described above can also be used for applications other than communication applications. For example, the dongle may have an application that requires authentication but might not otherwise interact with the NCG. The application may communicate with the NCG for authentication and generation of the shared secret Kc, but then the application may go on to interact with another server. The NCG shares the Kc with that other server both as a mechanism for introducing the client application to the server and to provide a way for the client and server to communicate securely. In the case of the server performing commercial transactions for the client, the server may communicate with the NCG, which provides a gateway to charging services in the wireless network. For example, a commercial transaction between the client application and the server may be charged to the user's wireless account.

In some examples, the user device that includes the SIM functionality is not necessarily a telephone or a computer. For example, the device may be a networked game console, which uses the NCG for authentication and possibly charging services via the wireless network. In the case of the game console, a dongle may be used. In this way, a game can be distributed along with the dongle for use on a networked game console without requiring modification of the game console to incorporate SIM functionality.

Figure 5:
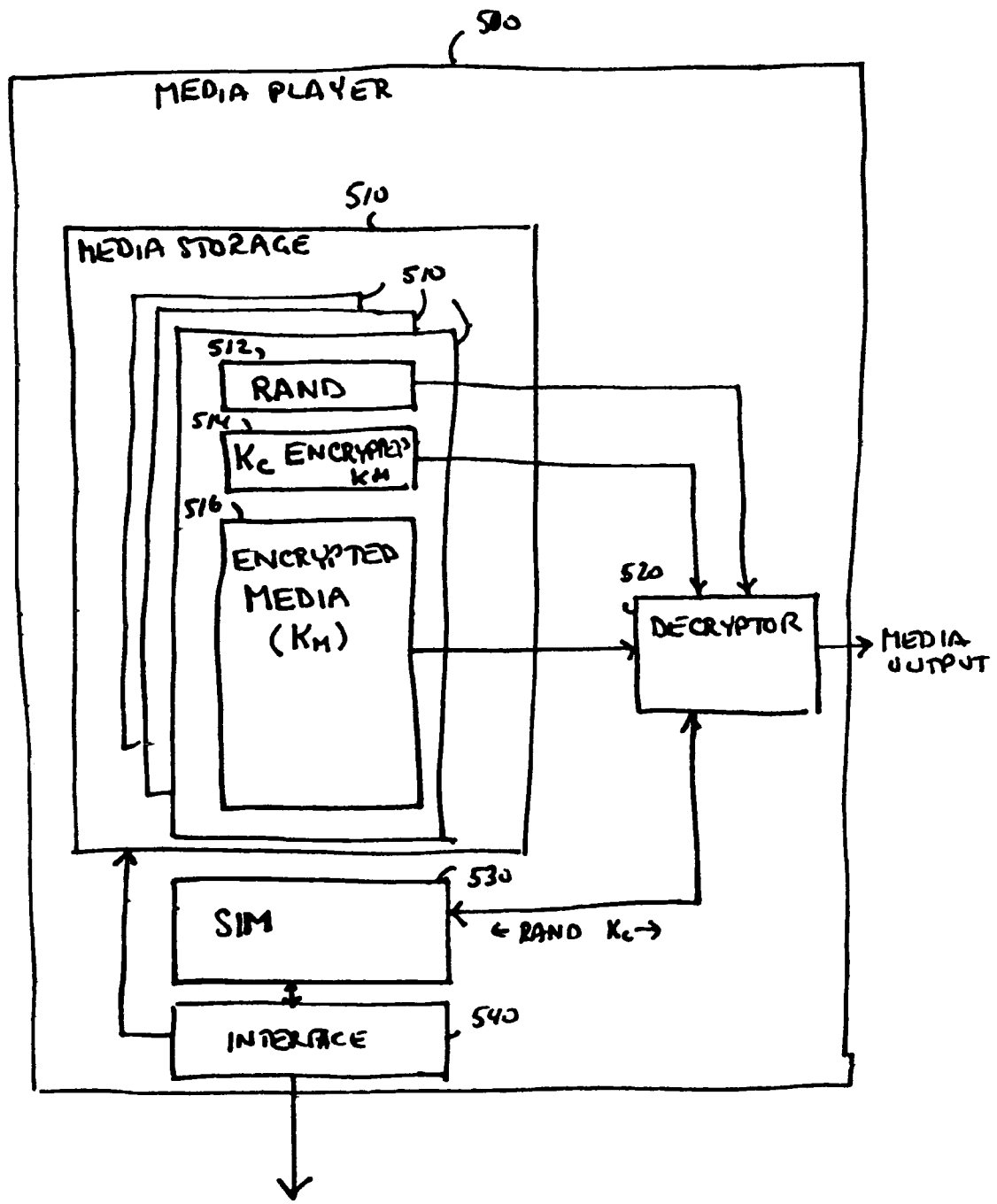
FIG. 5 is a media player.
Figure 6:
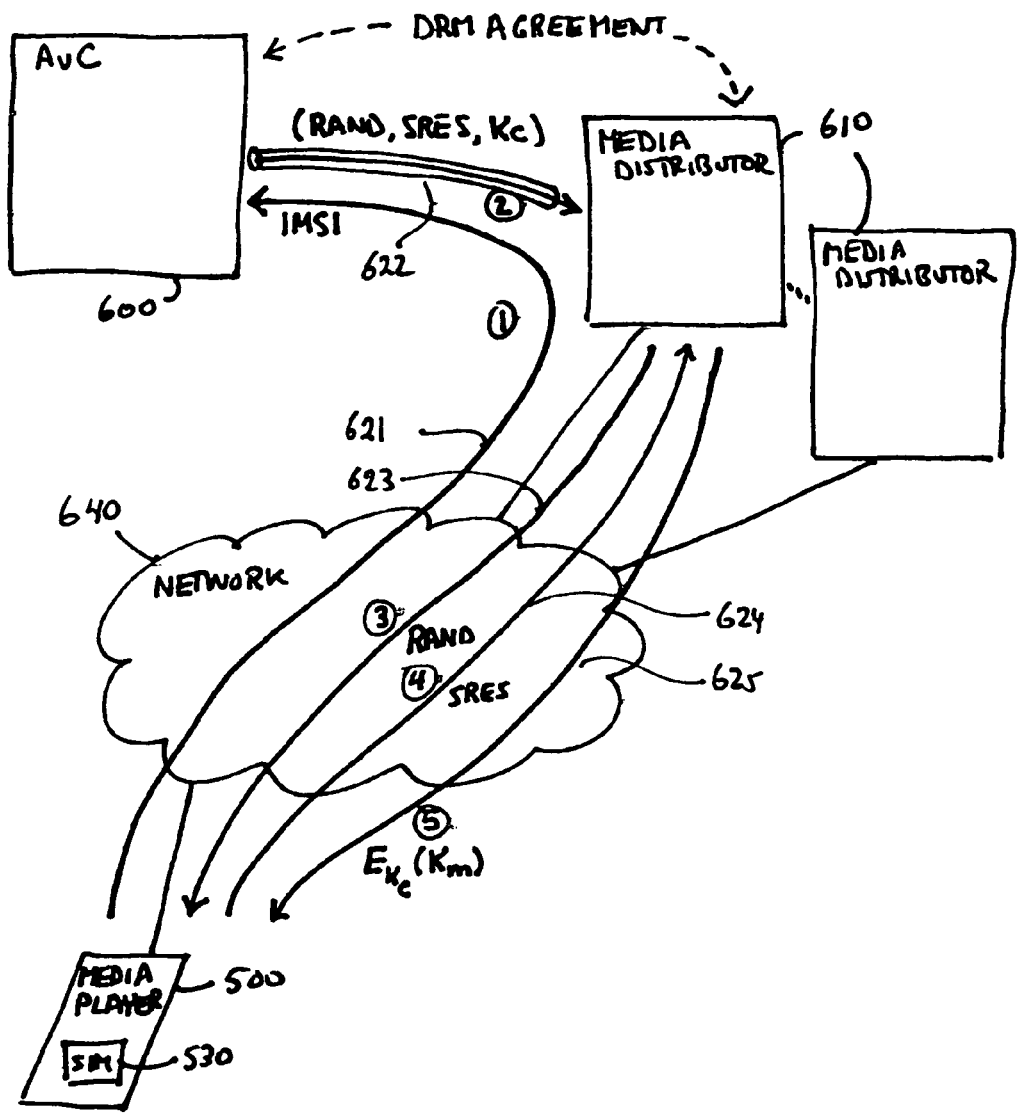
FIG. 6 is a network coupling a media player to media distributors.

In some examples the user device uses the SIM for digital rights management (DRM), for example, in addition to using the SIM for authentication and/or changing purposes. Referring to FIGS. 5 and 6, in some examples, a media player 500 includes a SIM 530. A media distributor 610 provides protected media to the media player over a network 640 (e.g., over the Internet, or over a telecommunication network) in such a way that the player cannot make use of the media unless it has an appropriate SIM, and such that the protected data cannot be used in other media players with different SIMs.

Referring to FIG. 5, the media player 500 has an interface 540 that provides a way for a the media distributor 610 to challenge the SIM 530, for example, in the manner described above in the context of a communication application, for the purpose of authenticating the media player. In addition, the media distributor 610 may independently use the functionality of the SIM to protect media that is distributed to the player.

In some examples, each media player 500 has a SIM 530 that shares a secret (Ki) with an Authentication Center (AuC) 600. In various examples, the AuC 600 is associated with a manufacturer of the media player 500, with a computer or software manufacturer, a media seller or distributor (e.g., an online music store), a credit card company, and a mobile network operator (e.g., the AuC 600 can be the same AuC 323 as shown in FIG. 3 in the context of a communication application).

In some examples, a series of interchanges occur between the media player 500, a media distributor 610, and the authentication center 600. Note that there may be multiple AuCs 600, for example, each associated with a different set of media players or associated with different SIMs used in the media players. There are, in general, multiple media distributors 610, and in some examples, each can make use of multiple different AuCs 600.

Referring to FIG. 6, a media player provides an identification, such as an IMSI stored in the SIM, to the media distributor 610. In the case of multiple AuCs 600, the media distributor 610 uses the identification to determine which AuC 600 will provide authentication data for the media player. The media distributor 610 passes the identifying information for the media player to the AuC 600. The AuC 600 and the media distributor 610 have a commercial DRM agreement in place which governs the terms under which the AuC will provide information to the distributor. If the AuC chooses to provide authentication information to the distributor, it uses the value of Ki it knows in association with the identifying information to generate a (RAND, SRES, Kc) triplet, which it passes back to the media distributor. To authenticate the media player, the media distributor sends RAND to the media player, which computes and returns SRES. If the SRES from the media player and the SRES from the AuC match, the media player is authenticated.

The media distributor 610 sends a bundle 510 that includes encrypted media 516 that is encrypted with a media key Km that is specific to the media in that bundle but not necessarily specific to the player or the user. The bundle 510 also includes a RAND value 512, and an encryption of the media key Km 514, which is encrypted with the SIM-generated key Kc that corresponds to the RAND 512.

When the player 500 needs to play the media, a decryptor 520 accepts the RAND 512 and the Kc-encrypted Km 514, and obtains Kc from the SIM 530 in exchange for the RAND. It uses Kc to decrypt Km, which it uses in turn to decrypt the media.

In some examples of similar DRM applications, some of the functions of the server application can be performed at a client computer, for example, coupled to the player 500. For example, the player 500 may have a USB interface to a client computer, and an application on the client computer uses the SIM 530 in the player for authentication of the application.

The approaches described above can alternatively use Universal Subscriber Identity Modules (USIM) or 3GPP IP Multimedia Subsystem Services Identity Modules (ISIM). In other examples, IS-41/SS7 or 3GPP2 protocols are used for similar approaches in CMDA or 3GPP2 networks. In some examples, use of a standard SIM, USIM, or ISIM is not necessarily required. For example, other cryptographic approaches can achieve similar results. In some examples, other cellular authentication protocols may be used, for example, using the Authentication and Key Agreement (AKA) protocol rather than current protocols based on the SIM. Similarly, the cellular telephone network is not necessarily a GSM based network. In some examples, similar cryptographic authentication mechanisms for CDMA and 3GPP2 networks are used. In some examples, a CMDA/CAVE protocol is used.

Embodiments can be implemented in hardware or in software, or a combination of both hardware and software. Software components can include instructions, stored on computer-readable media, such a non-volatile semiconductor memory and magnetic or optical disks. The instructions can be for execution various types of physical or virtual processors, including general purpose computers, special purpose controllers, signal processing devices, instruction interpreters and virtual machines.

Other embodiments are within the scope of the following claims.

What is claimed is:

1. An apparatus that is removably attachable to a computer system, the apparatus comprising:
    an authentication module including a module compatible with authentication in a mobile telephone network, the module including at least one of a Subscriber Identification Module (SIM), a Universal Subscriber Identity Module (USIM), a 3GPP IP Multimedia Subsystem Services Identity Module (ISIM), and a module compatible with a CDMA or 3GPP2 networks;
    a memory with application software stored therein, the application software, including instructions for execution of a communication application on the computer system, the communication application including a configurable user interface for emulating one of a plurality of mobile telephone devices; and
    an interface for communicating with a remote server over a data communication network;
    wherein the application software includes instructions, which, when loaded and executed on the computer system cause the computer system to:
        establish by a first application executing as a stand-alone application in an operating environment of an operating system of the computer system an application layer connection between the first application and the remote server without requiring a service of another application on the computer system to establish the application layer connection; and
        use by the first application executing on the computer system the authentication module to automatically authorize an application layer interaction between the first application and the remote server on the application layer connection.

2. The apparatus of claim 1 wherein the interface comprises a Universal Serial Bus (USB) interface.

3. The apparatus of claim 1 wherein the communication application comprises a softphone application.

4. The apparatus of claim 1 wherein the application layer interaction comprises a voice communication interaction.

5. The apparatus of claim 1 wherein the application layer interaction comprises a registration interaction.

6. The apparatus of claim 5 wherein the registration interaction includes a Session Initiation Protocol (SIP) interaction.

7. The apparatus of claim 1 wherein the instructions for using the authentication module to authorize the application layer interaction include instructions that cause authentication via a telephone network authentication system.

8. The apparatus of claim 1 further comprising a positioning system.

9. The apparatus of claim 8 wherein the positioning system comprises a Global Positioning System (GPS).

10. The apparatus of claim 8 wherein the application software comprises instructions for accessing the positioning system and providing location information over the data communication network.

11. A method comprising:
  loading executable software for a first application from a removable device onto a computer system, the first application including a communication application including a configurable user interface for emulating one of a plurality of mobile telephone devices; and
  executing the software on the computer system, including:
    establishing by the first application an application layer connection between the first application executing as a stand-alone application in an operating environment of an operating system of the computer system and a remote server over a data communication network without requiring a service of another application on the computer system to establish the application layer connection,
    accessing by the first application executing on the computer system an authentication module on the removable device, the authentication module including a module compatible with authentication in a mobile telephone network, the module including at least one of a Subscriber Identification Module (SIM), a Universal Subscriber Identity Module (USIM), a 3GPP IP Multimedia Subsystem Services Identity Module (ISIM), and a module compatible with a CDMA or 3GPP2 networks, and
    using the first application executing on the computer system the authentication module to automatically authorize an application layer interaction between the first application and the remote server on the application layer connection.

12. The method of claim 11 wherein executing of the software is performed on a mobile computer system to which the removable device is attached.

13. The method of claim 12 further comprising attaching the removable device to the mobile computer system.

14. The method of claim 11 wherein executing the communication application comprises executing a softphone application.

\* \* \* \* \*